No. 871,035. PATENTED NOV. 12, 1907.
G. M. HEAD.
COTTON CHOPPER.
APPLICATION FILED JAN. 12, 1907.
2 SHEETS—SHEET 1.
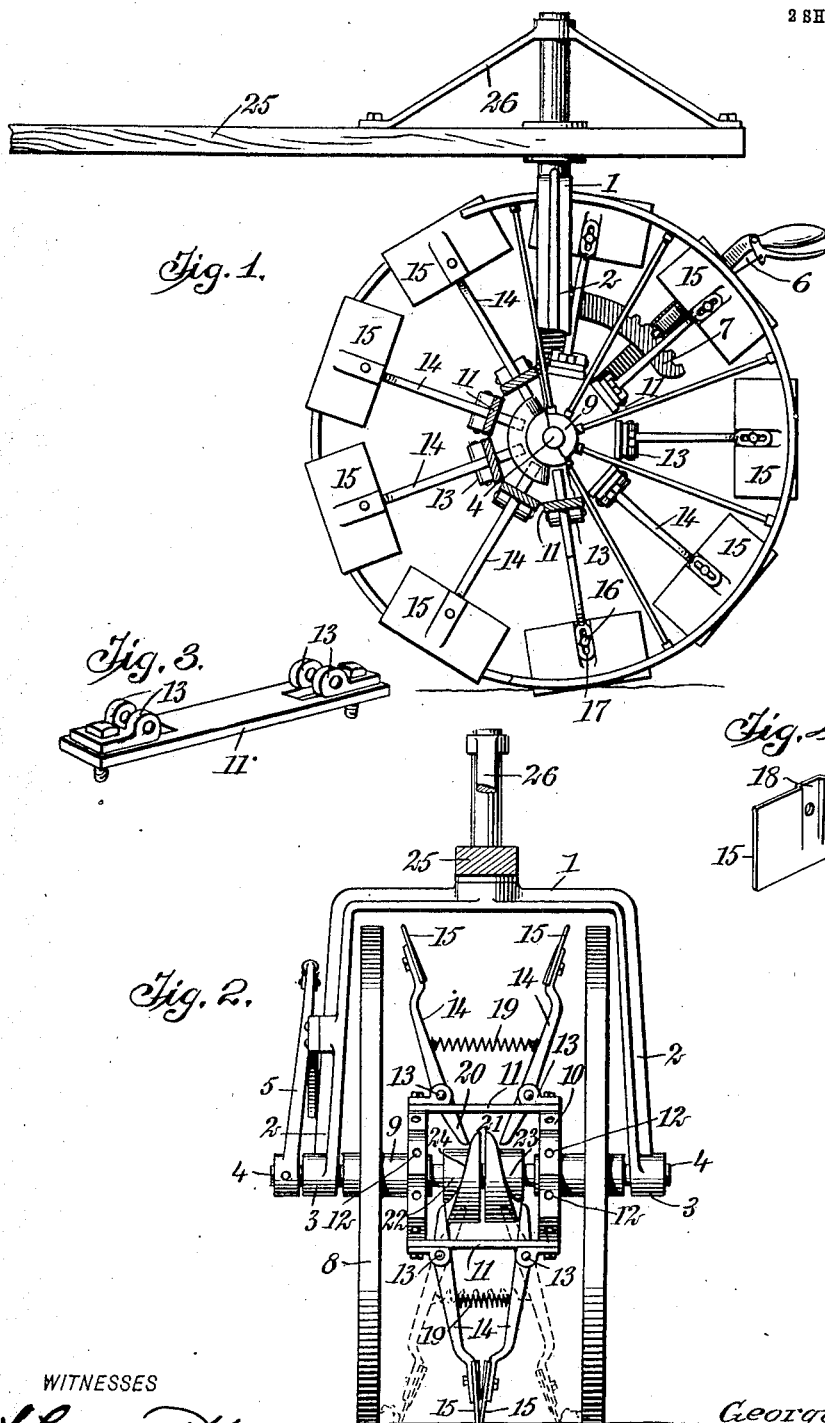
WITNESSES
INVENTOR
George M. Head
BY
ATTORNEYS

UNITED STATES PATENT OFFICE.

GEORGE MARSHALL HEAD, OF MARIANNA, ARKANSAS, ASSIGNOR TO HIMSELF, AND WILLIAM McCALEB, OF BLUFFS, ILLINOIS.

COTTON-CHOPPER.

No. 871,035.  Specification of Letters Patent.  Patented Nov. 12, 1907.

Application filed January 12, 1907. Serial No. 351,965.

*To all whom it may concern:*

Be it known that I, GEORGE M. HEAD, a citizen of the United States, and a resident of Marianna, in the county of Lee and State of Arkansas, have invented a new and Improved Cotton-Chopper, of which the following is a full, clear, and exact description.

This invention relates to cotton thinners or choppers which are adapted to be used by cotton planters for thinning or blocking out the rows of growing cotton. The object of the invention is to produce an implement of this class which is simple in construction and which may be advanced by a draft animal down the row of growing cotton; the construction being such that the implement operates automatically to thin out or chop out parts of the growing plant.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 5:
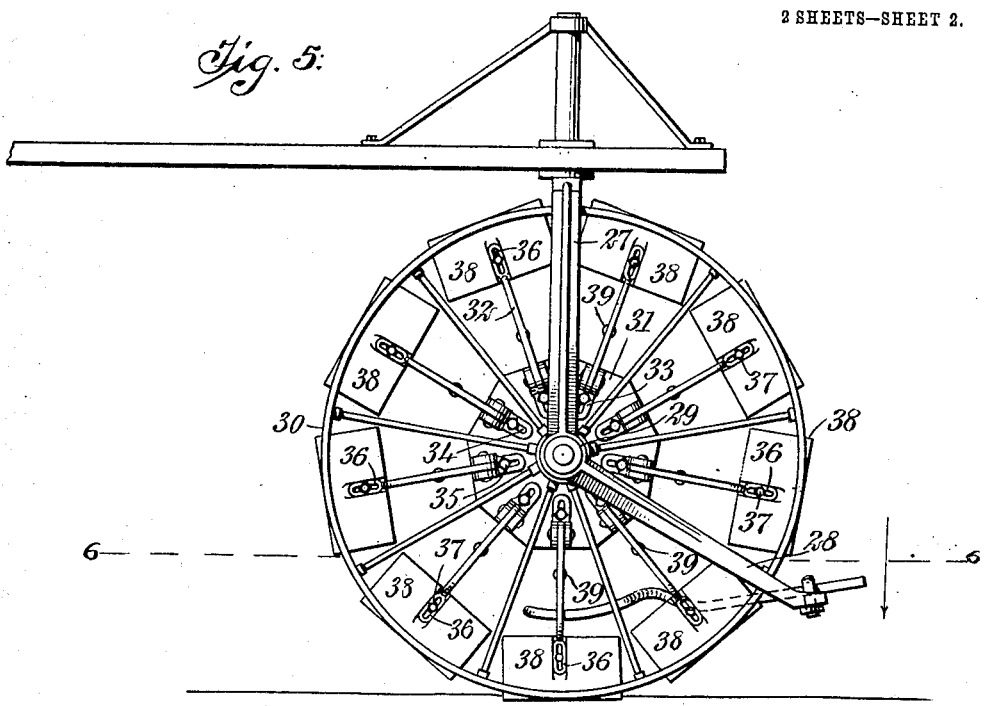
Figure 6:
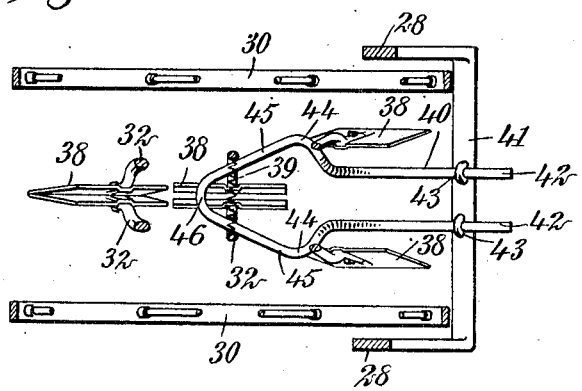

Figure 1 is a side elevation of a cotton chopper constructed according to my invention, a portion of the view being broken away and shown in cross section; Fig. 2 is a front elevation of the machine, a portion of the pole and its contiguous parts being shown in cross section; Fig. 3 is a perspective of a cross plate or hoe-holder, a plurality of which are mounted in the machine to carry the hoes which operate to do the work; Fig. 4 is a perspective of one of the blades or hoes; Fig. 5 is a side elevation of a cotton chopper showing a modified construction; and Fig. 6 is a further illustration of the modified construction, and is a horizontal section taken on the line 6—6 of Fig. 5.

Referring more particularly to the parts, 1 represents the frame of the machine, which has the form of a yoke as illustrated in Fig. 2, said yoke having downwardly extending arms 2 with hubs 3 formed at the lower extremities thereof. In the hubs 3 an axle 4 is mounted, and this axle is adapted to be held in a fixed position by means of a lever 5 having a locking mechanism 6 coöperating with a quadrant 7 fixed to the outer side of one of the arms 2, as indicated. The yoke 1 is supported on a pair of wheels 8 which are disposed respectively near the inner faces of the arms 2, and these wheels are loosely mounted on the axle 4, as will be readily understood. On their adjacent faces, the wheels 8 are provided with necks 9 which project toward each other and the inner extremities of these necks are formed into enlarged hubs 10. These hubs 10 are of polygonal form, so that they present a plurality of oppositely disposed edges to which cross bars or hoe-carriers 11 are rigidly bolted in the manner indicated in Fig. 2. In this figure only two of these cross bars 11 are represented, so that the construction may be more clearly understood. The figure represents the remainder of the cross bars as removed so as to disclose the stud holes 12, by means of which they are attached in position.

On the outer sides of the hoe-carriers 11, brackets 13 are attached, in which hoe-bars 14 are pivotally mounted. These bars extend outwardly in a radial direction, as shown, and to their outer extremities hoes or hoe-plates 15 are adjustably attached by means of bolts 16, the adjustments suggested being obtained by slots 17 formed respectively in the ends of the hoe-bars or arms through which the bolts 16 pass, as indicated. In order to prevent any tendency of the hoe-plates to shift upon the bars or arms 14, the bodies of the plates are preferably offset so as to form grooves 18 respectively.

The outer portions of the hoe-bars or arms are connected by helical compression springs 19 which tend to force the hoes or hoe-plates 15 apart in the manner illustrated at the upper portion of Fig. 2. The hoe-arms or bars 14 are extended beyond the clips or brackets 13 so as to form toes 20.

On the axle between the hubs 10 I provide a cam 21, which cam is preferably formed of two similar sections 22 and 23 which are alike, except that one is right-hand while the other is left-hand. These cam sections 22 and 23 present inclined or cam faces 24 which are adapted to be engaged by the toes 20 as the wheels rotate. The cam is so designed that as the wheels rotate with the advance of the implement, the toes 20 will allow the hoes to pass into the earth close together or in substantially the relation shown in Fig. 2. After the hoes are passed into the ground in the manner illustrated, their toes become suddenly released from the cam so that the springs 19 operate to force them apart and toward the relation in which they are indicated in dotted lines.

It should be understood that the implement is driven across the field so as to straddle the cotton rows individually, and the hoes are so adjusted with respect to the ground level that they will cut into the rows of cotton. When the hoes are forced apart in the manner suggested, they will dig out a part of the cotton and form an open space or cut in the row, as will be readily understood.

The lever 5 affords means for adjusting the position of the cam, so that the time in which the hoes move outwardly may be nicely regulated. In order to enable the implement to be advanced, a pole or tongue 25 is attached to the cross bar of the yoke 1, and is securely attached thereto by means of a double brace 26.

Instead of employing compression springs in the manner described above, I may employ tension springs which tend to bring the hoes together, while means is provided for forcing the hoes apart automatically as they rotate. This construction is very clearly illustrated in Figs. 5 and 6. In this instance, I provide the frame or yoke 27 with downwardly extending arms 28 which project in a rearward direction from the hubs 29. Wheels 30 are provided, which are similar to the wheels before described. These wheels are rigidly connected together in any suitable manner, and are formed with enlarged hubs 31, upon the side faces whereof a plurality of hoe-bars 32 are attached pivotally by means of suitable adjustable brackets 33, the said brackets being provided with slots 34 which permit of their being adjusted and secured rigidly in position by means of bolts 35 as indicated.

The outer extremities of the arms 32 are formed with slots 36 respectively, by means of which bolts 37 attach the hoes or hoe-plates 38.

Between the hoe-arms 32 helical springs 39 are provided, which tend to bring the hoes together as they pass the ground lines. I provide means for forcing the hoes apart while they are penetrating the earth, and for this purpose I provide a cam or cam frame 40 having the form shown. In order to mount this frame, the arms 28 are connected by a cross bar 41. The cam 40 consists of two integral parallel bars 42, the rear portions of which are attached to the cross bar 41 by suitable clips 43, as shown. Toward their forward portions, the bars 42 are offset outwardly so as to form shoulders 44, beyond which point they are formed into converging extensions 45 which are integrally united in a curve or tongue 46 disposed forwardly. As the rotation takes place, the tongue 46 becomes projected into the space between the bars, and the inclined extensions 45 force the same apart. After this outward movement has continued sufficiently to enable the arms to pass beyond the shoulders 44, they are brought together by the springs. In this way a movement of the hoes is produced very similar to that produced by the construction first described, but in this instance the separating of the hoes is more gradual, whereas in the first instance it is sudden, being produced by the sudden application of the spring. Of course, the form of the cam in each case will determine the manner in which the hoes operate.

While I have described the device as being especially useful as a cotton chopper, it is equally useful for thinning out peas, beans, beets, cane or other plants. Though described as an implement complete in itself, it is obvious that the essential part of the same is the hoes and the means for driving the hoes. Therefore the invention could be practiced by attaching these essential parts to the frame of another implement ordinarily used for another purpose.

Having thus described my invention, I claim as new and desire to secure by Letters Patent:

1. In an implement of the class described, in combination, a frame, wheels carried thereby, a plurality of hoe-arms pivotally mounted in pairs in a position folded together, hoes carried by said hoe-arms, means for holding said hoes back to back adjacent to each other and forcing the same into the earth as said wheels rotate, and means for forcing said hoes apart after penetrating the earth.

2. In an implement of the class described, in combination, a frame, an axle, wheels supported rotatably on said axle and having hubs, hoe-arms pivotally mounted between said hubs and having toes projecting inwardly toward said axle, springs connecting said hoe-arms, hoes carried by said hoe-arms, and a cam mounted on said axle and engaging said toes, said cam coöperating with said springs to allow said hoes to penetrate the earth in an adjacent position and forcing the same apart while in the earth.

3. In an implement of the class described, in combination, a frame, an axle carried thereby, a pair of wheels rotatably mounted on said axle and having enlarged hubs, hoe-carriers connecting said hubs, hoe-arms pivotally mounted on said carriers, hoes carried by said hoe-arms, springs connecting said hoe-arms, said hoe-arms having toes projecting toward said axle, a cam mounted on said axle between said hubs and adapted to engage said toes, a lever attached to said axle for adjusting the position of said cam, and means for locking said lever to said frame in a plurality of positions.

In testimony whereof I have signed my name to this specification in the presence of two subscribing witnesses.

GEORGE MARSHALL HEAD.

Witnesses:
 MATT SHEAHAN,
 ANTHONY HOCKDERFER.